(12) United States Patent
Merrill

(10) Patent No.: US 8,954,577 B2
(45) Date of Patent: Feb. 10, 2015

(54) ESTIMATING A COMPOSITION OF A POPULATION

(75) Inventor: John W. L. Merrill, Redmond, WA (US)

(73) Assignee: Google Inc., Mountain View, CA (US)

(*) Notice: Subject to any disclaimer, the term of this patent is extended or adjusted under 35 U.S.C. 154(b) by 281 days.

(21) Appl. No.: 13/537,833

(22) Filed: Jun. 29, 2012

(65) Prior Publication Data

US 2014/0006596 A1   Jan. 2, 2014

(51) Int. Cl.
  *G06F 15/173*  (2006.01)
(52) U.S. Cl.
  USPC .......................................................... 709/224
(58) Field of Classification Search
  CPC .............................................. G06F 17/30864
  USPC .......................................................... 709/224
  See application file for complete search history.

(56) References Cited

U.S. PATENT DOCUMENTS

| | | | |
|---|---|---|---|
| 2003/0014399 A1* | 1/2003 | Hansen et al. | ............... 707/3 |
| 2003/0211501 A1 | 11/2003 | Stephens et al. | |
| 2005/0256738 A1 | 11/2005 | Petrimoulx | |
| 2006/0178861 A1* | 8/2006 | Jojic et al. | ............... 703/11 |
| 2011/0077929 A1 | 3/2011 | Stanley et al. | |
| 2012/0116688 A1 | 5/2012 | Mishra et al. | |

OTHER PUBLICATIONS

International Search Report and Written Opinion in International Application No. PCT/US2013/048073, mailed on Feb. 28, 2014, 10 pages.

* cited by examiner

*Primary Examiner* — Yves Dalencourt
(74) *Attorney, Agent, or Firm* — Fish & Richardson P.C.

(57) ABSTRACT

A method performed by one or more processing devices includes receiving data indicative of amounts of users in population segments that access a resource; applying an expectation-maximization algorithm to the data received; generating, based on applying, estimates of weights indicative of an accuracy of the amounts of users; wherein the expectation-maximization algorithm is applied and the estimates are generated until the estimates reach an asymptotic approximation of the weights; adjusting the amounts of the users in accordance with the estimates of the weights; and generating, based on the amounts of the users adjusted, an estimate of a composition of a population of users that access the resource.

15 Claims, 4 Drawing Sheets

ESTIMATING A COMPOSITION OF A POPULATION

BACKGROUND

A capture-recapture method is a type of method commonly used in ecology to estimate population size of a study area. The capture-recapture method may be used when a researcher fails to detect all animals present, within a population of interest, every time the researcher visits the study area. Additionally, the capture-recapture method is used in estimating a population size based on data from a single source, namely, the study area.

An example of the capture-recapture method is the Lincoln-Petersen method. In the Lincoln-Petersen method, a researcher visits a study area, captures animals and marks the animals captured. At another point in time, the researcher visits the study area again and recaptures animals. The researcher determines whether any of the recaptured animals are also marked. In this example, the Lincoln-Petersen method is used to estimate a population size of the animals in accordance with the below formula:

$$N = \frac{MC}{R},$$

where
N=Estimate of total population size;
M=Total number of animals captured and marked on the first visit;
C=Total number of animals captured on the second visit; and
R=Number of animals captured on the first visit that were then recaptured on the second visit.

Other methods may also be used in estimating population sizes. For example, another method commonly used to estimate population size is the panel approach, including, e.g., generating a statistically sampled group of users to form an unbiased data source.

SUMMARY

In one aspect of the present disclosure, a method performed by one or more processing devices includes receiving data indicative of amounts of users in population segments that access a resource; applying an expectation-maximization algorithm to the data received; generating, based on applying, estimates of weights indicative of an accuracy of the amounts of users; wherein the expectation-maximization algorithm is applied and the estimates are generated until the estimates reach an asymptotic approximation of the weights; adjusting the amounts of the users in accordance with the estimates of the weights; and generating, based on the amounts of the users adjusted, an estimate of a composition of a population of users that access the resource.

Implementations of the disclosure can include one or more of the following features. In some implementations, receiving the data indicative of the amounts of users comprises: receiving population composition data indicative of the amounts of users in the population segments; and wherein the estimate of the composition of the population comprises weighted population composition data. In other implementations, the estimate of the composition of the population comprises: estimates of numbers of users in the population segments.

In other implementations, the amounts of the users adjusted has increased accuracy relative to an accuracy of the amounts of users in the data received. In some implementations, the method includes counting a number of users that access the resource; wherein generating the estimate comprises: generating based on the number of users counted and the amounts of the users adjusted. In still other implementations, the data received is received from a single biased data source.

In still another aspect of the disclosure, one or more machine-readable media are configured to store instructions that are executable by one or more processing devices to perform operations including receiving data indicative of amounts of users in population segments that access a resource; applying an expectation-maximization algorithm to the data received; generating, based on applying, estimates of weights indicative of an accuracy of the amounts of users; wherein the expectation-maximization algorithm is applied and the estimates are generated until the estimates reach an asymptotic approximation of the weights; adjusting the amounts of the users in accordance with the estimates of the weights; and generating, based on the amounts of the users adjusted, an estimate of a composition of a population of users that access the resource. Implementations of this aspect of the present disclosure can include one or more of the foregoing features.

In still another aspect of the disclosure, an electronic system includes one or more processing devices; and one or more machine-readable media configured to store instructions that are executable by the one or more processing devices to perform operations including: receiving data indicative of amounts of users in population segments that access a resource; applying an expectation-maximization algorithm to the data received; generating, based on applying, estimates of weights indicative of an accuracy of the amounts of users; wherein the expectation-maximization algorithm is applied and the estimates are generated until the estimates reach an asymptotic approximation of the weights; adjusting the amounts of the users in accordance with the estimates of the weights; and generating, based on the amounts of the users adjusted, an estimate of a composition of a population of users that access the resource. Implementations of this aspect of the present disclosure can include one or more of the foregoing features.

All or part of the foregoing can be implemented as a computer program product including instructions that are stored on one or more non-transitory machine-readable storage media, and that are executable on one or more processing devices. All or part of the foregoing can be implemented as an apparatus, method, or electronic system that can include one or more processing devices and memory to store executable instructions to implement the stated operations.

The details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Described herein is a system that estimates a composition of a population. Generally, a composition of a population includes data indicative of types and/or amounts of population segments included in a population, including, e.g., a population of users that access a resource.

Generally, a resource includes item(s) of data that can be provided over a network. Resources include surveys, HTML pages, web pages, websites, word processing documents, portable document format (PDF) documents, images, videos, applications, and so forth. Generally, a population segment includes a portion of a population associated with particular demographics. Generally, demographics include statistical characteristics of a population. Types of demographics include gender, race, age, disabilities, mobility, home ownership, employment status, geographic location, and so forth.

In an example, the system includes numerous users that visit a resource. In this example, the users may be assigned to various population segments, e.g., based on demographics of the users. For example, a population segment may include a portion of users of the system that are associated with particular demographics (e.g., males).

In this example, the system obtains population composition data. Generally, population composition data includes data indicative of a composition of a population that accesses a resource. For example, the population composition data may include data indicative of amounts of users in various population segments.

In this example, contents of the population composition data may be biased, e.g., based on techniques used in gathering the population composition data, based on a group of users from which the population composition data was generated, and so forth. To account for bias in the population composition data, the system generates values indicative of the accuracy of the amounts of users in various population segments.

To decrease an effect of the bias, the system adjusts the amounts of users in the various population segments in accordance the generated values. Using the adjusted amounts of users in the various population segments, the system generates the estimates of the composition of the population that accesses the resource. Because the estimates of the composition of the population are generated to account for the bias, the estimates of the composition have increased accuracy, relative to an accuracy of the population composition data.

Figure 1:
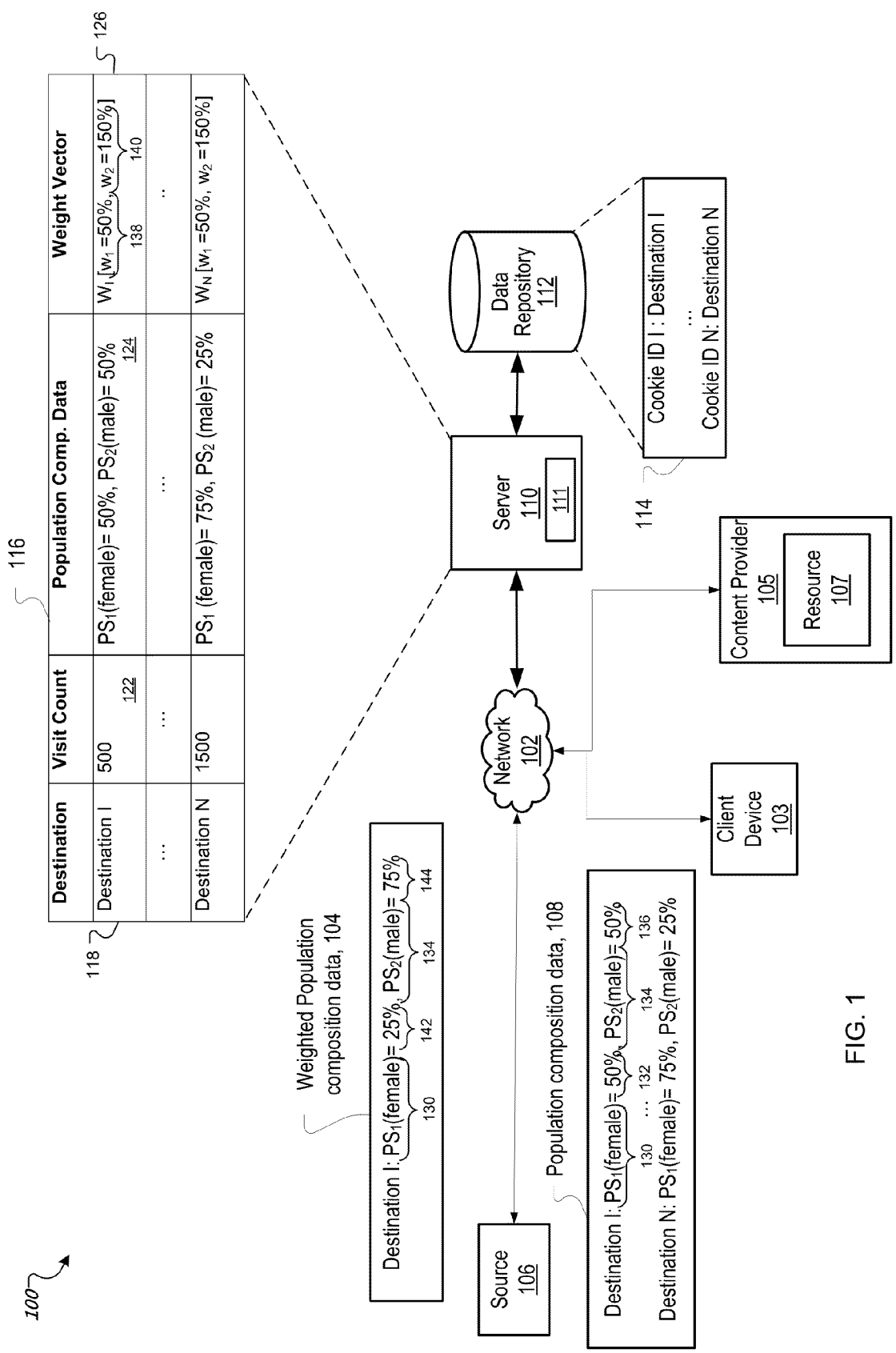
FIG. 1 is a diagram of an example of a network environment for estimating a composition of a population.

FIG. 1 is a diagram of an example of network environment 100 for estimating a composition of a population. Network environment 100 includes network 102, client device 103, source 106, content provider 105, server 110, and data repository 112. Generally, a source includes a provider of data. In the example of FIG. 1, source 106 provides population composition data 108 to server 110.

Client device 103, content provider 105 and source 106 can communicate with server 110 over network 102. Network environment 100 may include many thousands of data repositories, sources, content providers, client devices and servers, which are not shown. Server 110 may include various data engines, including, e.g., data engine 111. Although data engine 111 is shown as a single component in FIG. 1, data engine 111 can exist in one or more components, which can be distributed and coupled by network 102.

In the example of FIG. 1, content provider 105 hosts resource 107. In the example of FIG. 1, a user (not shown) of client device 103 accesses resource 107 from content provider 105, e.g., via network 102. In an example, data engine 111 is configured to use cookies to identify resources (e.g., resource 107) accessed by client devices (e.g., client device 103). In an example, data engine 111 generates destination data 114 to identify resources accessed by client devices. Generally, destination data includes data indicative of various destinations that have been visited by various users. Generally, a destination includes a location of resource (e.g., a uniform resource location (URL) of resource 107). In the example of FIG. 1, a destination of resource 107 is represented as "destination I."

In this example, data engine 111 sends a cookie (not shown) to client device 103. The cookie may include an identifier (ID) that uniquely identifies the cookie. In this example, resource 107 includes a script that causes data to be transmitted to server 110, e.g., when resource 107 is accessed by client device 103.

When client device 103 accesses resource 107, the script is executed, and client device 103 sends the cookie back to server 110. Using the cookie ID, data engine 111 updates destination data 114 with data indicative of a destination of resource 107 and the cookie ID. In the example of FIG. 1, destination data 114 includes associations between various cookie IDs (e.g., cookie ID I . . . cookie ID N) and various destinations of resources (e.g., destination I . . . destination N).

Population composition data 108 includes associations among demographic data and destinations (e.g., destination I . . . destination N). Generally, demographic data includes data indicative of demographics of users. For example, demographic data may include data indicative of amounts of users that are included in various population segments.

In the example of FIG. 1, population composition data 108 includes an association between destination I (e.g., the destination for resource 107) and demographic data. In this example, the demographic data associated with destination I includes population segments 130, 134. Population segment 130 is indicative of females that access destination I. In the example of FIG. 1, population segment 130 is represented as "$PS_1$(female)". Population segment 130 is associated with value 132, e.g., a value indicative of an amount of users that access destination I and that possess the demographics of population segment 130. Value 132 specifies that fifty percent of the users that visit destination I are in population segment 130 (e.g., female). In the example of FIG. 1, value 132 includes a percentage value. In other examples, value 132 may include an absolute number and/or a relative number.

Population segment 134 is indicative of males that access destination I. In the example of FIG. 1, population segment 134 is represented as "$PS_2$(male)". Population segment 134 is associated with value 136, e.g., a value indicative of an amount of users that access destination I and that possess the demographics of population segment 134. Value 136 specifies that fifty percent of the users that visit destination I are in population segment 134 (e.g., male).

In the example of FIG. 1, data engine 111 generates mapping 116. Generally, a mapping includes a data structure for association of items of data with other items of data. In this example, mapping 116 may be stored in data repository 112.

In an example, mapping 116 includes an association between a destination and a visit count. Generally, a visit count includes data indicative of a number of users that have visited a destination. For example, portions 118, 122 of mapping 116 specify that destination I is associated with a visit count having a value of five-hundred users. In this example, data engine 111 uses destination data 114 in generating a visit count for destination I. For example, data engine 111 is configured to count a number of cookie IDs that are associated with destination I in destination data 114. Data engine 111 populates portion 122 of mapping 116 with the visit count for destination I, e.g., the number of cookie IDs that are associated with destination I in destination data 114.

Mapping 116 also includes portions (e.g., portion 124) to be populated with population composition data 108 (and/or with portions of population composition data 108). In the example of FIG. 1, data engine 111 populates portion 124 with the portion of population composition data 108 for destination I.

Mapping 116 also includes portions (e.g., portion 126) to be populated with a vector that specifies one or more weights 138, 140 to be applied to values 132, 136 in population composition data 108. Generally, a weight includes a value indicative of an accuracy of another value. For example, weights 138, 140 include values indicative of accuracy of values 132, 136, respectively. In another example, weights 138, 140 may include values indicative of an amount of bias in values 132, 136.

In this example, weights 138, 140 specify an amount by which values 132, 136 in population composition data 108 are adjusted, e.g., to account for bias in values 132, 136. Through application of weights 138, 140 to values 132, 136, data engine 111 generates weighted composition data 104 with values 144, 142 for population segments 130, 134, respectively. In an example, values 144, 142 in weighted composition data 104 have increased accuracy in estimating the amounts of users in population segments 130, 134 that access resource 107, e.g., relative to the accuracy of values 132, 136 in population composition data 108.

In the example of FIG. 1, weight 138 has a value of fifty percent, specifying a fifty percent decrease in value 132 of population composition data 108. Through application of weight 138 to value 132 of population composition data 108, data engine 111 adjusts value 132, e.g., by decreasing value 132 by fifty percent. Based on the adjustment, data engine 111 generates value 142. In this example, value 142 is indicative of an estimated amount of users that access destination I and that possess demographics of population segment 130.

In the example of FIG. 1, weight 140 has a value of one-hundred fifty percent, specifying a one-hundred fifty percent increase in value 136 of population composition data 108. Through application of weight 140 to value 136 of population composition data 108, data engine 111 adjusts value 134, e.g., by increasing value 136 by one-hundred fifty percent. Based on the adjustment, data engine 111 generates value 144. In this example, value 144 is indicative of an estimated amount of users that access destination I and that possess demographics of population segment 134.

In an example, portion 124 of mapping 116 includes a vector of values 132, 136. In this example, data engine 111 generates weighted population composition data 104 by applying an operation to values 132, 136 in the vector in portion 124 and weights 138, 140 in the vector in portion 126. In this example, the operation may include a mathematical operation, including, e.g., a multiplicative operation, an additive operation, and so forth. In the example of FIG. 1, values 142, 144 are generated by applying a multiplicative operation to values 132, 136 and weights 138, 140, respectively.

Using values 142, 144 and the visit count specified in portion 122 of mapping 116, data engine 111 generates estimates of a number of users in population segments 130, 134.

In this example, data engine 111 generates a product of value 142 and the visit count specified in portion 122 of mapping 116 (e.g., 25%×500 users). The product generated is indicative of a number of users in population segment 130 that access destination I of resource 107.

Data engine 111 also generates a product of value 144 and the visit count specified in portion 122 of mapping 116 (e.g., 75%×500 users). The product generated is indicative of a number of users in population segment 134 that access destination I of resource 107.

Data engine 111 may implement various techniques in generating weights 138, 140. In an example, data engine 111 implements a maximum-likelihood estimation technique in generating weights 138, 140. Generally, maximum-likelihood estimation includes a method of estimating parameters of a statistical model. When applied to a data set and given a statistical model, maximum-likelihood estimation provides estimates for the model's parameters. In an example, the statistical model includes a customized model in which a set of labeled visitors to a site is generated by random sampling from various categories of users. In another example, the statistical model includes an Expectation-Maximization algorithm to generate maximum-likelihood estimates of weights iteratively.

In an example, data engine 111 generates a maximum-likelihood estimation of weights 138, 140 using the following techniques. In this example, D denotes a known population of individuals. Data engine 111 generates an unknown partition of D into disjoint demographic bins, $D = \cup D_i$. For a demographic bin, $L_i \subset D_i$ denotes a subset of labeled users. Data engine 111 generates set of weights, $w_i$, (e.g., weights 138, 140) such that $w_i |L_i| = |D_i|$ for all i.

In this example, data engine 111 generates values of $\vec{\mu}$, which maximizes the likelihood of the observed data, and $\{N_d, \vec{l}_d\}$ for destination d. In this example, $\vec{\mu}$ includes a vector of weights, in which the $i^{th}$ element of vector $\vec{\mu}$ is a weight assigned to an $i^{th}$ demographic bin. $N_d$ includes a numbers of unique visitors of destination d. $\vec{l}_d$ is a vector, whose $i^{th}$ element is the number of visitors of destination d who are labeled in the $i^{th}$ demographics bin.

Data engine 111 generates the expected value of in $\vec{m}_d^{(k)}$ given the observed counts and the current estimate $\vec{\mu}^{(k)}$, and computes the value of $\vec{\mu}^{(k+1)}$, which maximizes the likelihood of the observed and imputed parameters. $\vec{m}_d^{(k)}$ includes a vector after the $k^{th}$ iteration (e.g., of the Expectation-Maximization algorithm), whose $i^{th}$ element is a calibrated number of labeled visitors of destination d. $\vec{\mu}^{(k)}$ includes the weight vector after the $k^{th}$ iteration.

In this example, $\vec{\mu}^{(k+1)}$ is a weight, including, e.g., weights 138, 140. Data engine 111 computes the value of $\vec{\mu}^{(k+1)}$ in accordance with the following formulas:

$$m_{id}^{(k)} = \frac{l_{id} \frac{(1-\mu_i^{(k)})}{\mu_i^{(k)}}}{\sum_j l_{jd} \frac{(1-\mu_i^{(k)})}{\mu_i^{(k)}}}, \quad \text{Formula 1}$$

$$\mu_i^{(k+1)} = \frac{\sum_d m_{id}^{(k)}}{\sum_d l_{id}}. \quad \text{Formula 2}$$

The above Formulas 1 and 2 are included in the Expectation-Maximization algorithm. In this example, Formula 1 is the expectation step. The expectation step accepts the following inputs: inputs of the observations $\{N_d, T_d\}$, and the weight vector produced at the prior iteration of the Expectation-Maximization algorithm. Formula 2 includes the maximization step. The maximization step accepts the inputs of the in $\vec{m}_d^{(k)}$ at a prior expectation step. The maximization step produces a new estimate of the weights (e.g., weights 138, 140). The new estimates of weights are fed into the expectation step again, which produced the new $\vec{m}_d^{(k)}$ vectors for each d, and then an expectation step applies again to produce a new estimate of weights. This forms an iterative process. The weight vectors asymptotically approximate to the maximum likelihood estimate of weights.

As described above, $\vec{\mu}^{(k+1)}$ is a weight, including, e.g., weights 138, 140. As described herein, data engine 111 uses weights 138, 140 in computing weighted population composition data 104.

In a variation of FIG. 1, source 106 sends, to server 110, data at an individual level, including, e.g., data in which demographic data is associated with particular cookie IDs. In this example, source 106 may send to server 110 the following data: {Cookie ID I: Male, 18-24 . . . Cookie ID N: Female, 25-34}. In this example, the data sent to server 110 includes data associating demographic data (e.g., Male, 18-24) with Cookie ID I and data associating demographic data (e.g., Female, 25-34) with another Cookie ID, e.g., Cookie ID N.

In this example, data engine 111 is configured to generate population composition data 108, e.g., rather than receiving population composition data 108 from source 106. Data engine 111 generates population composition data 108 by matching Cookie IDs in the data sent from source 106 with the Cookie IDs in destination data 114.

For example, data engine 111 matches Cookie ID I (in the data sent from source 106) with Cookie ID I in destination data 114. In this example, Cookie ID I is associated with destination I. Using other matches of cookie IDs for destination I, data engine 111 identifies demographics of users that access destination I. Using the demographics of the users that access destination I, data engine 111 generates population composition data 108 for destination I.

In another example, source 106 includes a biased data source. Source 106 also includes an incomplete source, including, e.g., a source for which, among the users visiting destination I, some of the users are labeled by the source, and some of the users are not labeled by the source.

Figure 2:
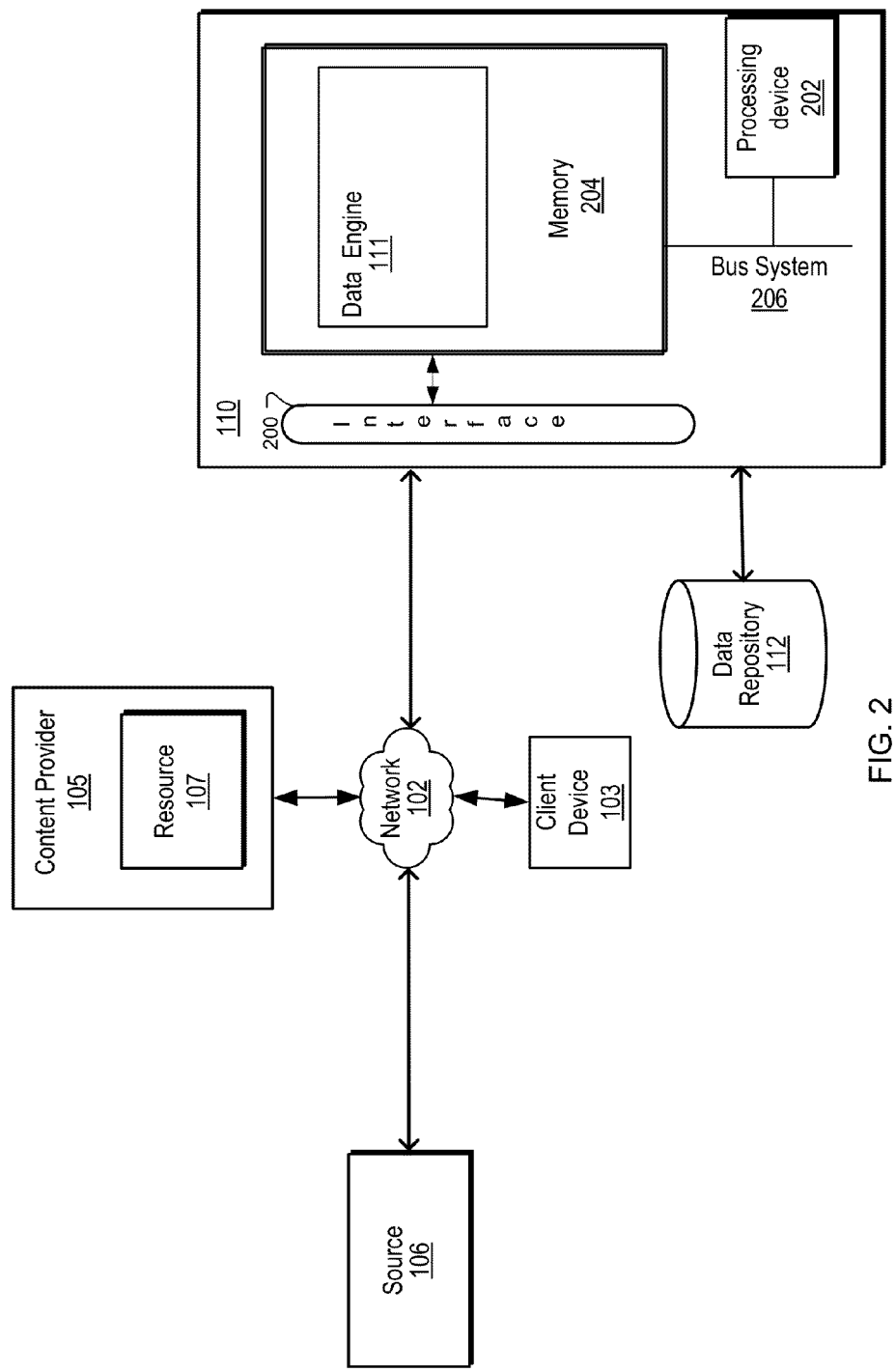
FIG. 2 is a block diagram showing examples of components of a network environment for estimating a composition of a population.

FIG. 2 is a block diagram showing examples of components of network environment 100 for estimating a composition of a population. In the example of FIG. 2, population composition data 108, weighted population composition data 104, mapping 116 and destination data 114 are not shown.

Source 106 and/or client device 103 can be a computing device capable of taking input from a user and communicating over network 102 with server 110 and/or with other computing devices. For example, source 106 and/or client device 103 can be a mobile device, a desktop computer, a laptop, a cell phone, a personal digital assistant (PDA), a server, an embedded computing system, a mobile device, and the like. Network environment 100 can include a plurality of computing devices, which can be geographically dispersed.

Network 102 can include a large computer network, including, e.g., a local area network (LAN), wide area network (WAN), the Internet, a cellular network, or a combination thereof connecting a number of mobile computing devices, fixed computing devices, and server systems. The network(s) may provide for communications under various modes or protocols, including, e.g., Transmission Control Protocol/Internet Protocol (TCP/IP), Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. Communication may occur through a radio-frequency transceiver. In addition, short-range communication may occur, including, e.g., using a Bluetooth, WiFi, or other such transceiver.

Server 110 can be a variety of computing devices capable of receiving data and running one or more services. In an example, server 110 can include a server, a distributed computing system, a desktop computer, a laptop, a cell phone, a rack-mounted server, and the like. Server 110 can be a single server or a group of servers that are at a same location or at different locations. Source 106 or client device 103 and server 110 can run programs having a client-server relationship to each other. Although distinct modules are shown in the figures, in some examples, client and server programs can run on the same device.

Content provider 105 can be a variety of computing devices capable of receiving data and running one or more services. In an example, content provider 105 can include a server, a distributed computing system, a desktop computer, a laptop, a cell phone, a rack-mounted server, and the like.

Server 110 can receive data from source 106, client device 103 and/or content provider 105 (and/or from data repository 112) through input/output (I/O) interface 200. I/O interface 200 can be a type of interface capable of receiving data over a network, including, e.g., an Ethernet interface, a wireless networking interface, a fiber-optic networking interface, a modem, and the like. Server 110 also includes a processing device 202 and memory 204. A bus system 206, including, for example, a data bus and a motherboard, can be used to establish and to control data communication between the components of server 110.

Processing device 202 can include one or more microprocessors. Memory 204 can include a hard drive and a random access memory storage device, including, e.g., a dynamic random access memory, or other types of non-transitory machine-readable storage devices. As shown in FIG. 2, memory 204 stores computer programs that are executable by processing device 202. These computer programs include data engine 111. Data engine 111 can be implemented in software running on a computer device (e.g., server 110), hardware or a combination of software and hardware.

Figure 3:
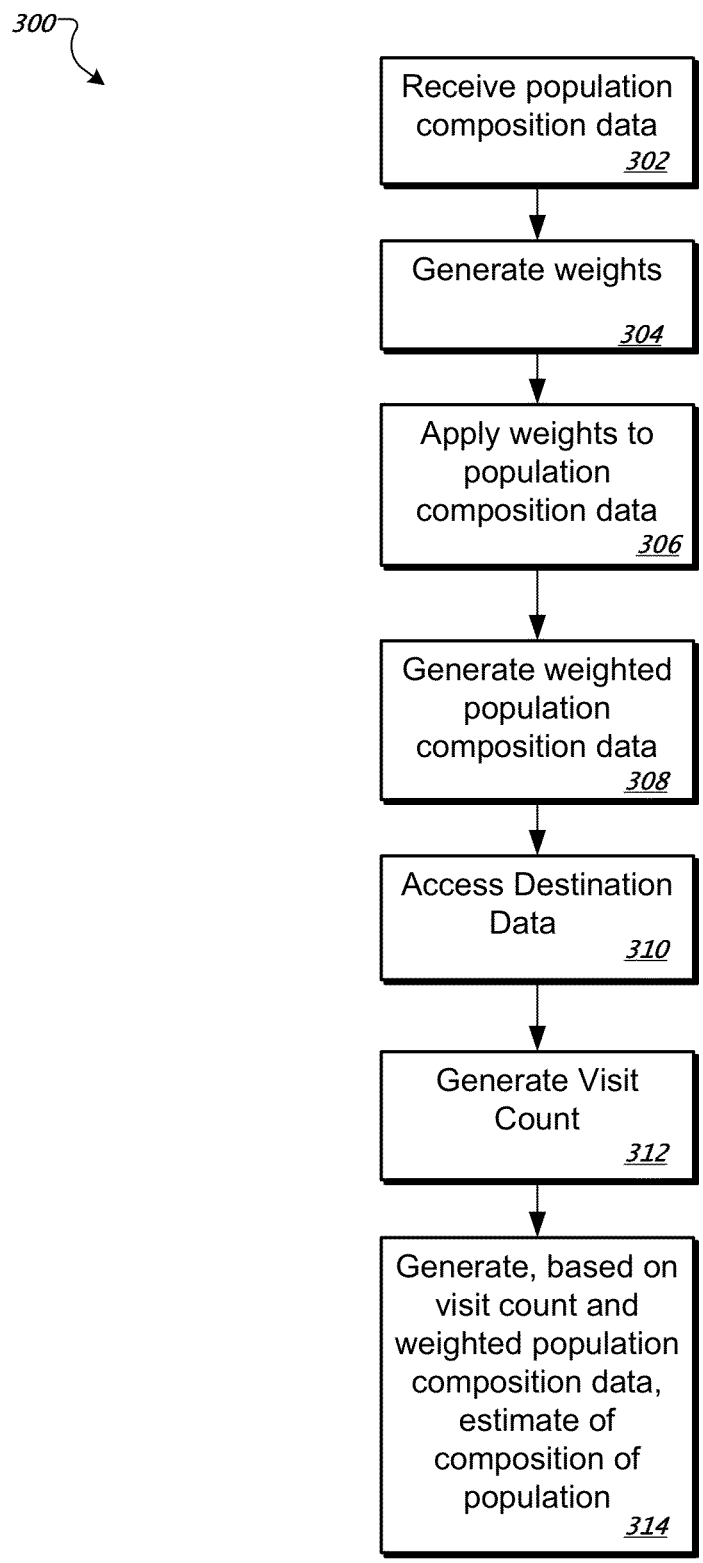
FIG. 3 is a flowchart showing a process for estimating a composition of a population.

FIG. 3 is a flowchart showing an example process 300 for estimating a composition of a population. In FIG. 3, process 300 is performed on server 110 (and/or on data engine 111).

In operation, data engine 111 receives (302) population composition data 108. As previously described, population composition data 108 includes values 132, 136 indicative of amounts of users in population segments 130, 134, respectively. Using the above-described techniques, data engine 111 generates (304) weights 138, 140.

Data engine 111 applies (306) weights 138, 140 to values 132, 136 in population composition data 108. Based on application of weights 138, 140, data engine 111 generates (308) weighted population composition data 104. Weighted population composition data 104 includes values 142, 144 for population segments 130, 134, respectively. Values 142, 144 are based on values 132, 136 adjusted in accordance with weights 138, 140.

Data engine 111 also accesses (310) destination data 114. Using contents of destination data 114, data engine 111 generates (312) a visit count for destination I. Using the visit count and weighted population composition data 104, data engine 111 generates (314) an estimate of a composition of the population that accesses destination I of resource 107. In this example, data engine 107 generates the estimate by applying an operation to values 142, 144 and the visit count. For example, data engine 111 applies a multiplicative operation to values 142, 144 and the visit count. Based on application of the multiplicative operation, data engine 111 generates a product of value 142 and the visit count. The product is indicative of a number of users in population segment 130 that access destination I.

Based on another application of the multiplicative operation, data engine 111 generates a product of value 144 and the visit count. This product is indicative of a number of users in population segment 134 that access destination I. In an example, the estimate of the composition of the population includes the products generated.

Figure 4:
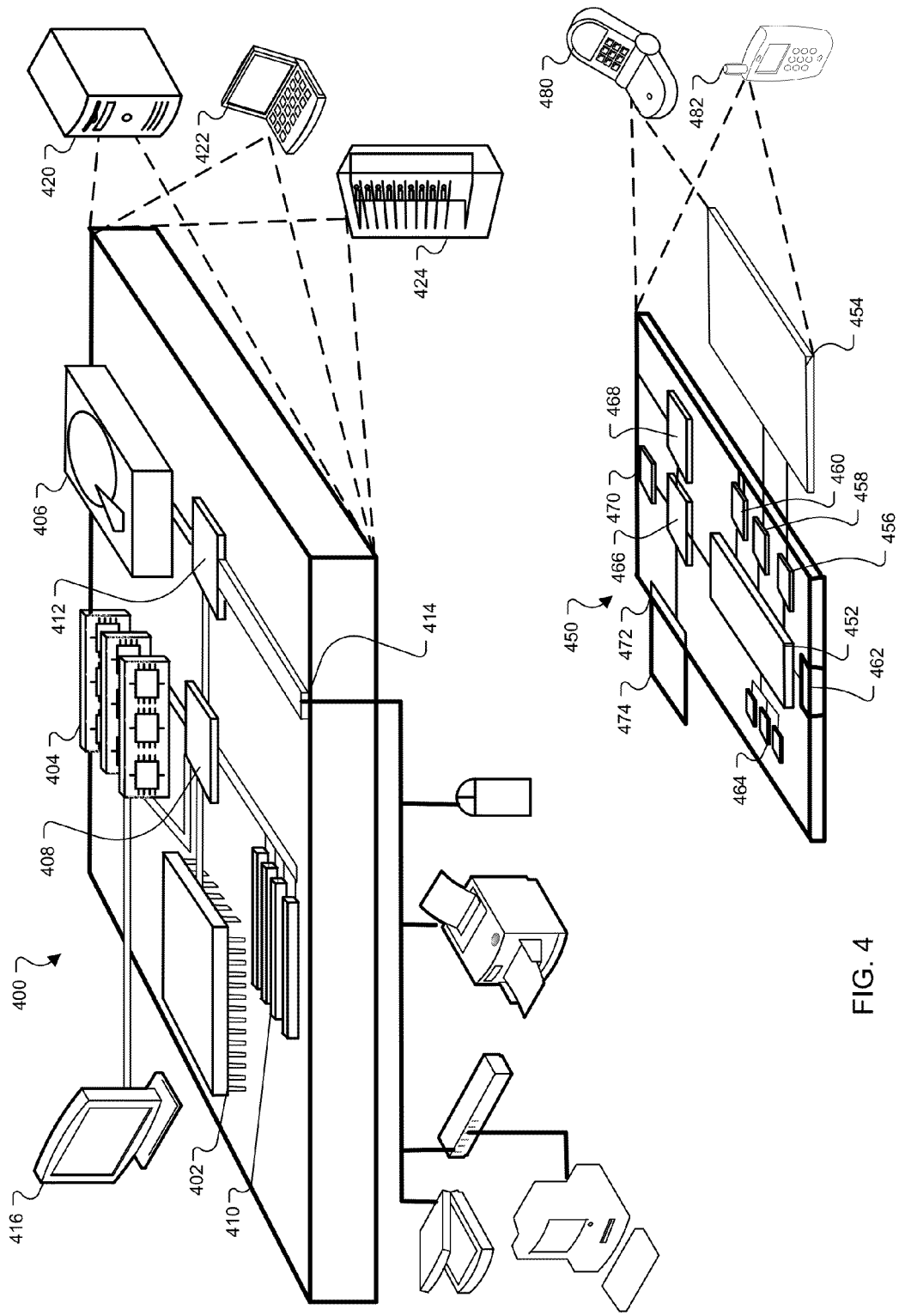
FIG. 4 shows an example of a computer device and a mobile computer device that can be used to implement the techniques described herein.

FIG. 4 shows an example of computer device 400 and mobile computer device 450, which can be used with the techniques described here. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, and other similar computing devices. The components shown here, their connections and relationships, and their functions, are meant to be examples only, and are not meant to limit implementations of the techniques described and/or claimed in this document.

Computing device 400 includes processor 402, memory 404, storage device 406, high-speed interface 408 connecting to memory 404 and high-speed expansion ports 410, and low speed interface 412 connecting to low speed bus 414 and storage device 406. Each of components 402, 404, 406, 408, 410, and 412, are interconnected using various busses, and can be mounted on a common motherboard or in other manners as appropriate. Processor 402 can process instructions for execution within computing device 400, including instructions stored in memory 404 or on storage device 406 to display graphical data for a GUI on an external input/output device, such as display 416 coupled to high speed interface 408. In other implementations, multiple processors and/or multiple buses can be used, as appropriate, along with multiple memories and types of memory. Also, multiple computing devices 400 can be connected, with each device providing portions of the necessary operations (e.g., as a server bank, a group of blade servers, or a multi-processor system).

Memory 404 stores data within computing device 400. In one implementation, memory 404 is a volatile memory unit or units. In another implementation, memory 404 is a non-volatile memory unit or units. Memory 404 also can be another form of computer-readable medium, such as a magnetic or optical disk.

Storage device 406 is capable of providing mass storage for computing device 400. In one implementation, storage device 406 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in a data carrier. The computer program product also can contain instructions that, when executed, perform one or more methods, such as those described above. The data carrier is a computer- or machine-readable medium, such as memory 404, storage device 406, memory on processor 402, and the like.

High-speed controller 408 manages bandwidth-intensive operations for computing device 400, while low speed controller 412 manages lower bandwidth-intensive operations. Such allocation of functions is an example only. In one implementation, high-speed controller 408 is coupled to memory 404, display 416 (e.g., through a graphics processor or accelerator), and to high-speed expansion ports 410, which can accept various expansion cards (not shown). In the implementation, low-speed controller 412 is coupled to storage device 406 and low-speed expansion port 414. The low-speed expansion port, which can include various communication ports (e.g., USB, Bluetooth®, Ethernet, wireless Ethernet), can be coupled to one or more input/output devices, such as a keyboard, a pointing device, a scanner, or a networking device such as a switch or router, e.g., through a network adapter.

Computing device 400 can be implemented in a number of different forms, as shown in the figure. For example, it can be implemented as standard server 420, or multiple times in a group of such servers. It also can be implemented as part of rack server system 424. In addition or as an alternative, it can be implemented in a personal computer such as laptop computer 422. In some examples, components from computing device 400 can be combined with other components in a mobile device (not shown), such as device 450. Each of such devices can contain one or more of computing device 400, 450, and an entire system can be made up of multiple computing devices 400, 450 communicating with each other.

Computing device 450 includes processor 452, memory 464, an input/output device such as display 454, communication interface 466, and transceiver 468, among other components. Device 450 also can be provided with a storage device, such as a microdrive or other device, to provide additional storage. Each of components 450, 452, 464, 454, 466, and 468, are interconnected using various buses, and several of the components can be mounted on a common motherboard or in other manners as appropriate.

Processor 452 can execute instructions within computing device 450, including instructions stored in memory 464. The processor can be implemented as a chipset of chips that include separate and multiple analog and digital processors. The processor can provide, for example, for coordination of the other components of device 450, such as control of user interfaces, applications run by device 450, and wireless communication by device 450.

Processor 452 can communicate with a user through control interface 458 and display interface 456 coupled to display 454. Display 454 can be, for example, a TFT LCD (Thin-Film-Transistor Liquid Crystal Display) or an OLED (Organic Light Emitting Diode) display, or other appropriate display technology. Display interface 456 can comprise appropriate circuitry for driving display 454 to present graphical and other data to a user. Control interface 458 can receive commands from a user and convert them for submission to processor 452. In addition, external interface 462 can communicate with processor 442, so as to enable near area communication of device 450 with other devices. External interface 462 can provide, for example, for wired communication in some implementations, or for wireless communication in other implementations, and multiple interfaces also can be used.

Memory 464 stores data within computing device 450. Memory 464 can be implemented as one or more of a computer-readable medium or media, a volatile memory unit or units, or a non-volatile memory unit or units. Expansion memory 474 also can be provided and connected to device 450 through expansion interface 472, which can include, for example, a SIMM (Single In Line Memory Module) card interface. Such expansion memory 474 can provide extra storage space for device 450, or also can store applications or other data for device 450. Specifically, expansion memory 474 can include instructions to carry out or supplement the processes described above, and can include secure data also. Thus, for example, expansion memory 474 can be provide as a security module for device 450, and can be programmed with instructions that permit secure use of device 450. In addition, secure applications can be provided via the SIMM cards, along with additional data, such as placing identifying data on the SIMM card in a non-hackable manner.

The memory can include, for example, flash memory and/or NVRAM memory, as discussed below. In one implementation, a computer program product is tangibly embodied in a data carrier. The computer program product contains instructions that, when executed, perform one or more methods, such as those described above. The data carrier is a computer- or machine-readable medium, such as memory 464, expansion memory 474, and/or memory on processor 452, that can be received, for example, over transceiver 468 or external interface 462.

Device 450 can communicate wirelessly through communication interface 466, which can include digital signal processing circuitry where necessary. Communication interface 466 can provide for communications under various modes or protocols, such as GSM voice calls, SMS, EMS, or MMS messaging, CDMA, TDMA, PDC, WCDMA, CDMA2000, or GPRS, among others. Such communication can occur, for example, through radio-frequency transceiver 468. In addition, short-range communication can occur, such as using a Bluetooth®, WiFi, or other such transceiver (not shown). In addition, GPS (Global Positioning System) receiver module 470 can provide additional navigation- and location-related wireless data to device 450, which can be used as appropriate by applications running on device 450.

Device 450 also can communicate audibly using audio codec 460, which can receive spoken data from a user and convert it to usable digital data. Audio codec 460 can likewise generate audible sound for a user, such as through a speaker, e.g., in a handset of device 450. Such sound can include sound from voice telephone calls, can include recorded sound (e.g., voice messages, music files, and the like) and also can include sound generated by applications operating on device 450.

Computing device 450 can be implemented in a number of different forms, as shown in the figure. For example, it can be implemented as cellular telephone 480. It also can be implemented as part of smartphone 482, personal digital assistant, or other similar mobile device.

Using the techniques described herein, a system is configured to generate an estimate of a composition of a population that accesses a resource. The system generates the estimate based on an application of weights to population composition data.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the systems and techniques described here can be implemented on a computer having a display device (e.g., a CRT (cathode ray tube) or LCD (liquid crystal display) monitor) for displaying data to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the engines described herein can be separated, combined or incorporated into a single or combined engine. The engines depicted in the figures are not intended to limit the systems described here to the software architectures shown in the figures.

For situations in which the systems and techniques discussed herein collect personal data about users, the users may be provided with an opportunity to opt in/out of programs or features that may collect personal data (e.g., data about a user's preferences or a user's current location). In addition, particular data may be anonymized in one or more ways before it is stored or used, so that personally identifiable data is removed. For example, a user's identity may be anonymized so that no personally identifiable data can be determined for the user, or a user's geographic location may be generalized where location data is obtained (e.g., to a city, zip code, or state level), so that a particular location of the user cannot be determined.

All processes described herein and variations thereof (referred to as "the processes") contain functionality to ensure that party privacy is protected. To this end, the processes may be programmed to confirm that a user's membership in a social networking account is publicly known before divulging, to another party, that the user is a member. Likewise, the processes may be programmed to confirm that data about a party is publicly known before divulging that data to another party, or even before incorporating that data into a social graph.

A number of embodiments have been described. Nevertheless, it will be understood that various modifications can be made without departing from the spirit and scope of the processes and techniques described herein. In addition, the logic flows depicted in the figures do not require the particular order shown, or sequential order, to achieve desirable results. In addition, other steps can be provided, or steps can be eliminated, from the described flows, and other components can be added to, or removed from, the described systems. Accordingly, other embodiments are within the scope of the following claims

What is claimed is:

1. A method performed by one or more processing devices, comprising:
    receiving data indicative of amounts of users in population segments that access a resource;
    applying an expectation-maximization algorithm to the data received;
    generating, based on applying, estimates of weights indicative of an accuracy of the amounts of users;
    wherein the expectation-maximization algorithm is applied and the estimates are generated until the estimates reach an asymptotic approximation of the weights;
    adjusting the amounts of the users in accordance with the estimates of the weights;
    counting a number of users that access the resource; and
    generating, based on the amounts of the users adjusted and the number of users counted, an estimate of a composition of a population of users that access the resource.

2. The method of claim 1, wherein receiving the data indicative of the amounts of users comprises:
    receiving population composition data indicative of the amounts of users in the population segments; and
    wherein the estimate of the composition of the population comprises weighted population composition data.

3. The method of claim 1, wherein the estimate of the composition of the population comprises:
    estimates of numbers of users in the population segments.

4. The method of claim 1, wherein the amounts of the users adjusted has increased accuracy relative to an accuracy of the amounts of users in the data received.

5. The method of claim 1, where the data received is received from a single biased data source.

6. One or more machine-readable hardware storage devices storing instructions that are executable by one or more processing devices to perform operations comprising:
    receiving data indicative of amounts of users in population segments that access a resource;
    applying an expectation-maximization algorithm to the data received;
    generating, based on applying, estimates of weights indicative of an accuracy of the amounts of users;
    wherein the expectation-maximization algorithm is applied and the estimates are generated until the estimates reach an asymptotic approximation of the weights;
    adjusting the amounts of the users in accordance with the estimates of the weights;
    counting a number of users that access the resource; and
    generating, based on the amounts of the users adjusted and the number of users counted, an estimate of a composition of a population of users that access the resource.

7. The one or more machine-readable hardware storage devices of claim 6, wherein receiving the data indicative of the amounts of users comprises:
    receiving population composition data indicative of the amounts of users in the population segments; and
    wherein the estimate of the composition of the population comprises weighted population composition data.

8. The one or more machine-readable hardware storage devices of claim 6, wherein the estimate of the composition of the population comprises:
    estimates of numbers of users in the population segments.

9. The one or more machine-readable hardware storage devices of claim 6, wherein the amounts of the users adjusted has increased accuracy relative to an accuracy of the amounts of users in the data received.

10. The one or more machine-readable hardware storage devices of claim 6, where the data received is received from a single biased data source.

11. An electronic system comprising:
    one or more processing devices; and
    one or more machine-readable hardware storage devices storing instructions that are executable by the one or more processing devices to perform operations comprising:
        receiving data indicative of amounts of users in population segments that access a resource;
        applying an expectation-maximization algorithm to the data received;
        generating, based on applying, estimates of weights indicative of an accuracy of the amounts of users;
        wherein the expectation-maximization algorithm is applied and the estimates are generated until the estimates reach an asymptotic approximation of the weights;
        adjusting the amounts of the users in accordance with the estimates of the weights;
        counting a number of users that access the resource; and
        generating, based on the amounts of the users adjusted and the number of users counted, an estimate of a composition of a population of users that access the resource.

12. The electronic system of claim 11, wherein receiving the data indicative of the amounts of users comprises:
    receiving population composition data indicative of the amounts of users in the population segments; and
    wherein the estimate of the composition of the population comprises weighted population composition data.

13. The electronic system of claim 11, wherein the estimate of the composition of the population comprises:
    estimates of numbers of users in the population segments.

14. The electronic system of claim 11, wherein the amounts of the users adjusted has increased accuracy relative to an accuracy of the amounts of users in the data received.

15. The electronic system of claim 11, where the data received is received from a single biased data source.

* * * * *